June 20, 1933. J. K. E. DIFFENDERFFER 1,915,016
GRINDING TOOL
Filed Nov. 6, 1929

John K. E. Diffenderffer
Inventor;
C. A. Snow & Co.
Attorneys.

Patented June 20, 1933

1,915,016

UNITED STATES PATENT OFFICE

JOHN K. E. DIFFENDERFFER, OF BALTIMORE, MARYLAND, ASSIGNOR TO CARR-LOWREY GLASS CO., OF BALTIMORE, MARYLAND

GRINDING TOOL

Application filed November 6, 1929. Serial No. 405,197.

This invention relates to a grinding tool or reamer designed primarily for use in grinding the inner surfaces of bottle necks.

Heretofore it has been practice, by some bottle manufacturers, to use a tool having an axial bore or passage opening at one end into the bottle being treated. The tool has also been provided with one or more return channels in its outer surface so that water and abrasive material admitted to the bottle can be washed out through the channels.

While a tool of the type described has worked efficiently where water can be supplied under pressure, it has been found that it is not always possible to use it advantageously where water under pressure is not available.

It is an object of the present invention to provide a grinding tool which can be used under all conditions, the rotation of the tool during the grinding operation being utilized to set up a centrifugal action which will cause water to be delivered therefrom with considerable force and expelled through the delivery channels with such speed as to carry away particles of glass.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing.

Figures 1, 2, 3, 4:
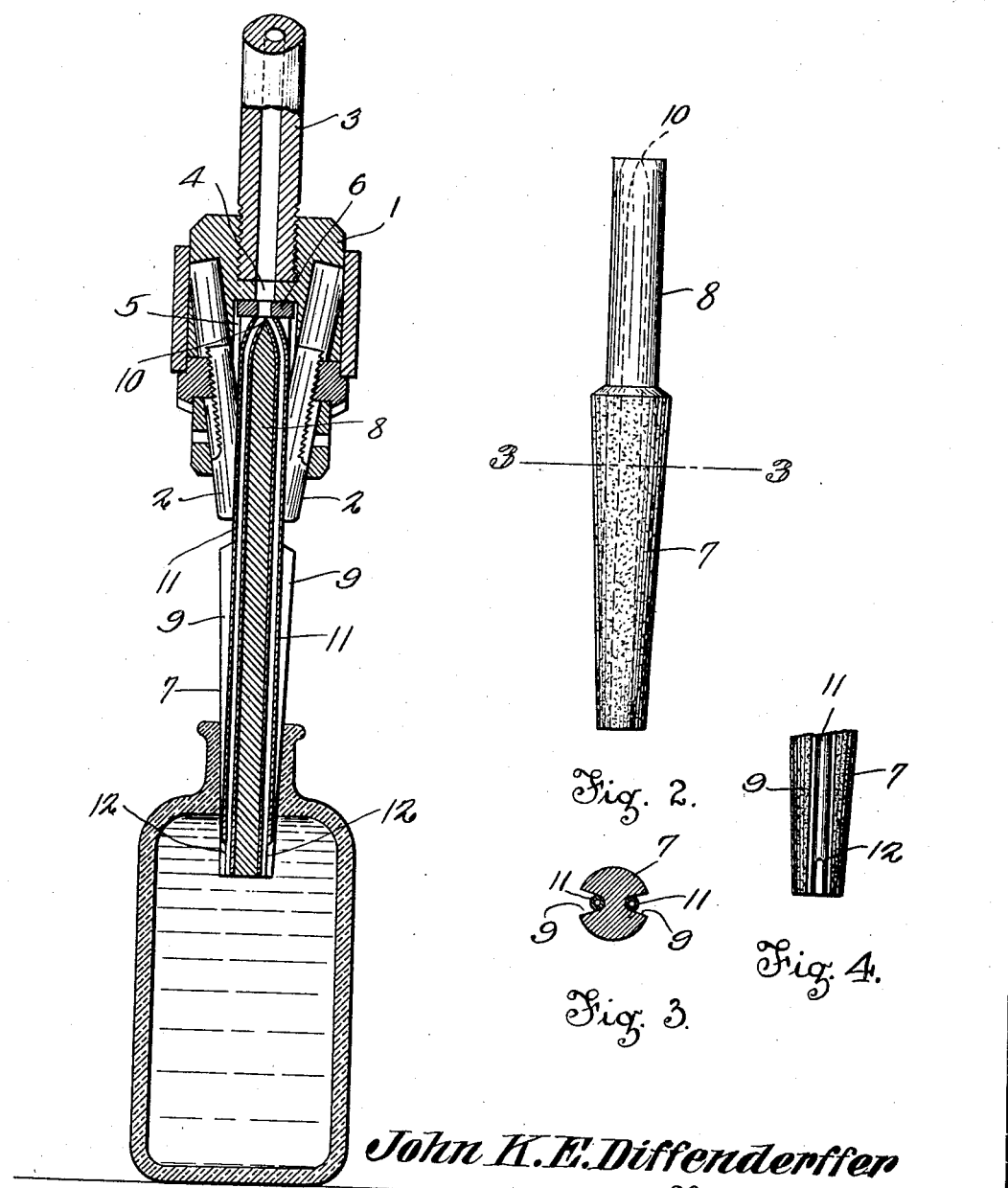
Figure 1 is a section through the grinding tool held by a chuck and seated in the neck portion of a bottle.
Figure 2 is a side elevation of the tool.
Figure 3 is a section on line 3—3, Figure 2.
Figure 4 is an elevation of a portion of the tool showing one of the outlet openings.

Referring to the figures by characters of reference, 1 designates a chuck having jaws 2 adapted to grip the shank of a grinding tool. This chuck has a spindle 3 extending therefrom and adapted to be rotated by any suitable means. The spindle is tubular and opens into an aperture 4 formed in the chuck at the base of the shank receiving socket 5 in the chuck. This socket is designed to receive a washer 6 of any suitable sealing material such as leather, rubber, etc. and the washer constitutes an abutment for the shank of the tool as hereinafter explained.

The grinding tool has a tapered body portion 7 from the large end of which is extended a shank 8. Both the body portion and the shank are formed with opposed longitudinal channels 9 extending from one end to the other of the tool, those ends of the channels within the free end portion of shank 8 being brought together at the axial center of the tool as shown at 10.

A water conducting tube 11 is seated in each of the channels 9 and extends from one end to the other of the tool. These tubes converge where the channels come together at 10 so that, when the shank 8 is seated tightly against the washer 6, both tubes will be in communication with the opening in the center of the washer. The other ends of the tubes are formed with short longitudinal slots 12 opening radially into the channels 9 and outwardly from the tool.

The tubes 11 are held in the channels by any suitable means. They can be tightly wedged therein, soldered, or restrained by upsetting the walls of the channels. The external diameter of each tube is less than the depth of its channel 9 at the shallowest point so that when the body portion of the tool is in engagement with a surface being ground there is always sufficient clearance between said surface and the tube to permit free flow of water along the channels.

The body 7 is provided preferably with minute particles of diamonds held thereto in any suitable way, these abrasive particles constituting the means for quickly grinding the inner surface of a bottle neck when the tool is rotated at a high speed therein.

It is designed to rotate the tool at a high speed and said tool is to be so mounted as to allow for a continuous flow of water through the spindle 3, opening 4, and washer 6 into the ends of the tubes 11. As the upper ends of the tubes diverge downwardly it will be apparent that as the tool is rotated at a high speed a centrifugal force will be set up within these diverging portions of the tubes which will accelerate the flow of water through the tubes. This flow will be further accelerated by centrifugal force at the outlet slots 12 where the water will be thrown outwardly by the rapidly rotating tool.

By means of the foregoing, a thorough washing of the bottle neck during the grinding operation is effected because the water delivered into the bottle will be expelled outwardly through the channels 9 and carry away particles of glass removed by the grinding operation. By utilizing centrifugal force as a means for establishing a circulation of water it is not necessary to use water under pressure. Instead the chuck and the tool carried thereby can be connected to the outlet end of a siphon and the tool can even be supplied with water from a tank in which the bottle is partly submerged. The tool can also be supplied with water in containers supported adjacent thereto. Thus the apparatus can be set up at any point desired within a shop without going to the expense of installing pipe lines.

A further advantage in constructing a tool such as described resides in the fact that when very small bottle necks are being ground it is not possible to have an axial bore and longitudinal external channels of sufficient capacity to properly carry off the particles of glass during the grinding operation and at the same time maintain the requisite strength in the tool. With the present structure, however, no central bore is required, the channels only being utilized both for the inflow and outflow of the water. As a matter of fact in very small tools, one of the channels and the tube therein could be eliminated.

What is claimed is:

1. A grinding tool having a longitudinal channel intersecting its grinding face, and means seated in and extending longitudinally of the channel for setting up a circulation of water longitudinally of the tool by centrifugal force when the tool is rotated at a high speed.

2. A grinding tool including a grinding body and a shank, there being a channel extending longitudinally of the body and shank, and a tube seated within and extending longitudinally of the channel, said tube having a water inlet at the axis of rotation of the tool and a water outlet remote from the axis of rotation, there being a clearance within the channel and along the tube for free circulation of the water when the body is in engagement with a surface being ground.

3. A grinding tool including a body and a shank, longitudinal channels in the body and shank, tubes seated within the channels and extending longitudinally of the tool, said tubes having a water inlet at the longitudinal axis of the tool and having outlets spaced from said axis whereby a circulation of water through the tubes is set up by centrifugal force when the tool is rotated, the maximum diameter of the tubes being less than the minimum depth of the channels in the body.

In testimony that I claim the foregoing as my own, I have hereto affixed my signature.

JOHN K. E. DIFFENDERFFER.